(12) United States Patent
White

(10) Patent No.: US 9,002,418 B2
(45) Date of Patent: *Apr. 7, 2015

(54) DEVICES, SYSTEMS AND METHODS FOR IDENTIFICATION THROUGH A MOBILE DEVICE

(71) Applicant: AT&T Mobility II LLC, Atlanta, GA (US)

(72) Inventor: Spencer Neil White, Norcross, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/653,279

(22) Filed: Oct. 16, 2012

(65) Prior Publication Data

US 2013/0040709 A1 Feb. 14, 2013

Related U.S. Application Data

(63) Continuation of application No. 12/615,695, filed on Nov. 10, 2009, now Pat. No. 8,290,552.

(51) Int. Cl.
*H04W 88/02* (2009.01)
*H04M 1/725* (2006.01)
*H04M 1/02* (2006.01)

(52) U.S. Cl.
CPC .......... *H04M 1/7253* (2013.01); *H04M 1/0283* (2013.01)

(58) Field of Classification Search
CPC .......................... H04M 1/0249; H04M 1/0252
See application file for complete search history.

(56) References Cited

U.S. PATENT DOCUMENTS

| 6,711,418 | B1 | 3/2004 | Wang et al. |
| 7,079,832 | B2 | 7/2006 | Zalewski et al. |
| 7,155,199 | B2 | 12/2006 | Zalewski et al. |
| 7,164,088 | B1 * | 1/2007 | Yurochko et al. ............. 200/5 A |

(Continued)

FOREIGN PATENT DOCUMENTS

WO  WO 2009014366  1/2009

OTHER PUBLICATIONS

U.S. Office Action dated Sep. 29, 2011 in U.S. Appl. No. 12/615,695.

(Continued)

*Primary Examiner* — Vladimir Magloire
*Assistant Examiner* — Frank Donado
(74) *Attorney, Agent, or Firm* — Hartman & Citrin LLC

(57) ABSTRACT

Devices, systems and methods are disclosed which relate to a smart cover for a mobile communications device. The smart cover includes a housing plate, a secure element coupled to the housing plate, a transceiver in communication with the secure element, and an antenna coupled to the transceiver. The transceiver and the antenna are coupled to the housing plate as well. The housing plate couples to the mobile communications device. A user having a mobile communications device with a smart cover may enter secure areas, pay funds from an account, or anything else requiring positive identification by holding the mobile communications device up to a smart cover reader. The smart cover reader communicates with the smart cover to identify the user. The user may allow others to use the smart cover by decoupling the smart cover from the user's mobile communications device and coupling it to the other's mobile communications device.

20 Claims, 5 Drawing Sheets

(56) References Cited

U.S. PATENT DOCUMENTS

| | | | |
|---|---|---|---|
| 7,333,062 | B2 | 2/2008 | Leizerovich et al. |
| 7,468,702 | B2 | 12/2008 | Leizerovich et al. |
| 7,635,086 | B2 | 12/2009 | Spencer, II |
| 7,774,231 | B2 | 8/2010 | Pond et al. |
| 8,260,199 | B2* | 9/2012 | Kowalski .................. 455/41.1 |
| 2003/0146821 | A1 | 8/2003 | Brandt |
| 2003/0194974 | A1* | 10/2003 | Curtis et al. .............. 455/90.1 |
| 2005/0026661 | A1* | 2/2005 | Rheenen et al. ........... 455/575.8 |
| 2006/0019696 | A1* | 1/2006 | Brunel et al. .............. 455/550.1 |
| 2006/0040081 | A1* | 2/2006 | Hodsdon et al. ............ 428/40.1 |
| 2006/0170656 | A1* | 8/2006 | Kwon ........................ 345/169 |
| 2006/0287004 | A1* | 12/2006 | Fuqua ........................ 455/558 |
| 2008/0055167 | A1* | 3/2008 | Leizerovich et al. ........ 343/702 |
| 2008/0057867 | A1 | 3/2008 | Trappeniers et al. |
| 2009/0069051 | A1* | 3/2009 | Jain et al. ................... 455/558 |
| 2010/0161433 | A1 | 6/2010 | White |
| 2010/0184493 | A1* | 7/2010 | Lin et al. ................... 455/575.7 |
| 2010/0320266 | A1 | 12/2010 | White |
| 2010/0321325 | A1 | 12/2010 | Springer et al. |
| 2010/0325006 | A1 | 12/2010 | White |
| 2011/0031319 | A1* | 2/2011 | Kiekhaefer et al. ........ 235/492 |
| 2011/0099079 | A1 | 4/2011 | White |
| 2011/0306297 | A1* | 12/2011 | Chang et al. ............... 455/41.2 |

OTHER PUBLICATIONS

U.S. Office Action dated Mar. 8, 2012 in U.S. Appl. No. 12/615,695.

U.S. Notice of Allowance dated Jun. 20, 2012 in U.S. Appl. No. 12/615,695.

* cited by examiner

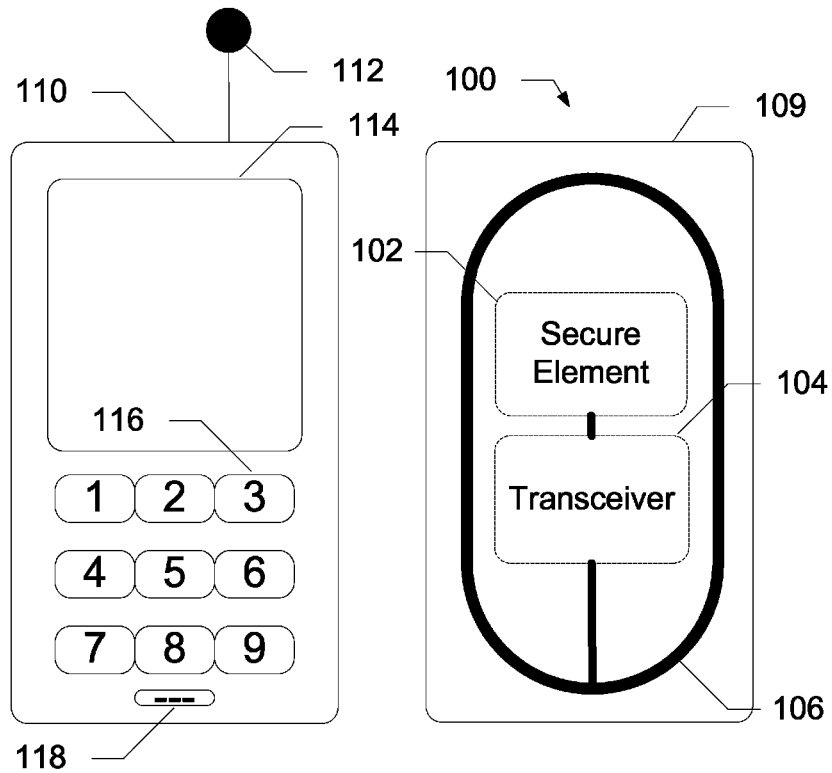
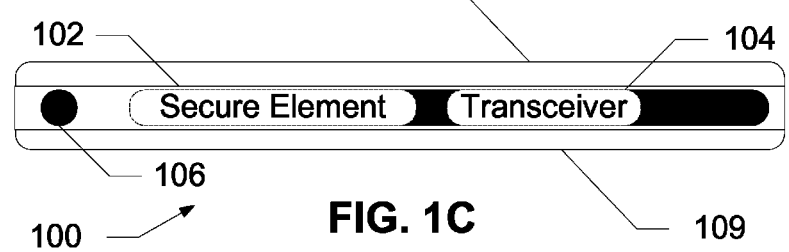

DEVICES, SYSTEMS AND METHODS FOR IDENTIFICATION THROUGH A MOBILE DEVICE

This application is a continuation of U.S. patent application Ser. No. 12/615,695, filed Nov. 10, 2009, now U.S. Pat. No. 8,290,552, the content of which is hereby incorporated by reference herein in its entirety into this disclosure.

BACKGROUND OF THE INVENTION

1. Field of the Invention

The present invention relates to secure identification. More specifically, the present invention relates to secure identification using a mobile communications device.

2. Background of the Invention

Wireless communications devices, such as cellular telephones, have become tremendously popular. It is estimated that there were 3.3 billion cellular phone subscriptions at the end of 2007. Close to 80% of the world now enjoys cellular coverage, a figure only increasing as new networks appear. Along with the abundance of cellular telephones comes the demand for new and improved services. It is no longer enough to just place and receive calls, users want it all.

With the pervasive use of mobile devices, these devices are being used in all aspects of life. Not only are mobile devices used for placing telephone calls, they have become mobile computers. However, as the number of devices and their uses has increased, so has the amount of personal information stored on the devices. Mobile devices may contain files such as personal contacts, messages, documents, and even financial information.

This means that mobile devices are being used for more than just communicating with users of other devices. Mobile devices are "smarter" and are able to communicate with more and more types of devices, as the technology to make smaller and more scalable transceivers and communication elements is incorporated into the devices.

Further, electronic payments are slowly migrating from the magnetic stripe to a contactless or near-field-communication (NFC) transaction.

Contactless transacting is likely to be the dominant form for mobile payments in the future. However, the availability of personal and financial information on mobile devices makes these devices a target for criminals. It is desirable that the mobile device need not contain any sensitive information. Moreover, it is desirable that a mobile device be used almost universally for accessing resources such as making purchases, unlocking doors, etc.

What is therefore needed is a way to use a mobile device to access secure resources conveniently and without risk.

SUMMARY OF THE INVENTION

The present invention is a smart cover for a mobile communications device. Exemplary embodiments of the smart cover include a housing plate, a secure element coupled to the housing plate, a transceiver in communication with the secure element, and an antenna coupled to the transceiver. The transceiver and the antenna are coupled to the housing plate as well. The housing plate couples to the mobile communications device to provide protection for electronics in the mobile communications device, to make the mobile communications device more aesthetically pleasing, etc. A user having a mobile communications device with a smart cover may enter secure areas, pay funds from an account, or anything else requiring positive identification. The user holds the mobile communications device up to a smart cover reader. The smart cover reader communicates with the smart cover to identify the user. The user may allow others to use the smart cover by decoupling the smart cover from the user's mobile communications device and coupling it to the other's mobile communications device.

Furthermore, the smart cover can be adapted to be coupled to any mobile communications device. The smart cover may provide housing for the front, the back, or any other surface or combination of surfaces of the mobile communications device. Smart cover readers can be placed at checkouts, restaurants, banks, etc., for a convenient positive identification. Positive identification allows entry to secure areas or transfer of funds from an account. The secure element is powered through the antenna when a magnetic field is introduced in a form of contactless communication. This allows the smart cover to work independent of a battery or any other power source other than that provided by the smart cover reader.

In one exemplary embodiment, the present invention is a smart cover removably coupled to a mobile communications device. The smart cover includes a housing plate for the mobile communications device, a secure element coupled to the housing plate, a transceiver coupled to the housing plate, the transceiver being in communication with the secure element, and an antenna coupled to the housing plate and the transceiver.

In another exemplary embodiment, the present invention is a system for secure identification. The system includes a mobile communications device, a smart cover coupled to the communications device, and a smart cover reader in communication with the smart cover. The smart cover reader verifies a unique identifier via the smart cover.

In yet another exemplary embodiment, the present invention is a method of making a smart card. The method includes coupling a secure element having a unique identifier, a transceiver, and an antenna with a housing plate. The housing plate is adapted to be removably coupled to a mobile communications device.

BRIEF DESCRIPTION OF THE DRAWINGS

FIGS. 1A, 1B, and 1C show a smart cover 100 coupled to a mobile communications device 110, according to an exemplary embodiment of the present invention.

DETAILED DESCRIPTION OF THE INVENTION

Figures 2A, 2B:
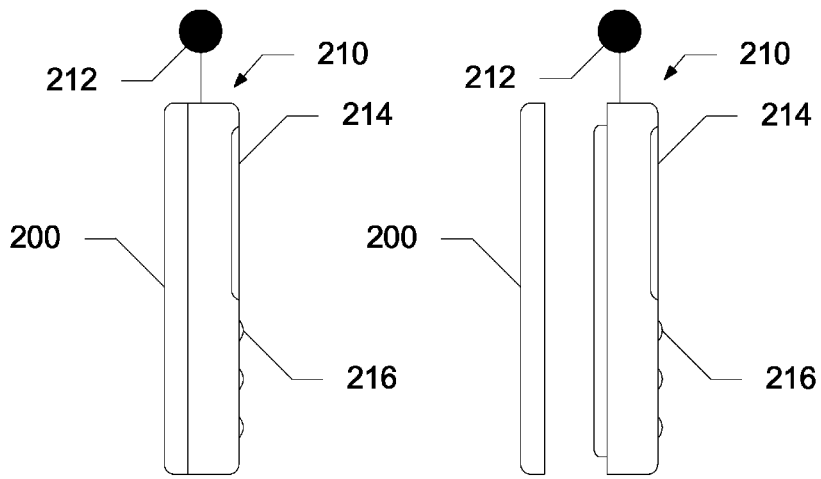
FIGS. 2A and 2B show a smart cover 200 coupled and decoupled from a mobile communications device 210, according to an exemplary embodiment of the present invention.

The present invention is a smart cover for a mobile communications device. Exemplary embodiments of the smart cover include a housing plate, a secure element coupled to the housing plate, a transceiver in communication with the secure element, and an antenna coupled to the transceiver. The transceiver and the antenna are coupled to the housing plate as well. The housing plate is designed to protect electronic components within the mobile communications device, and in some instances, serves to make the mobile communications device more aesthetically pleasing. A user having a mobile communications device with a smart cover may gain access to a secure area, pay funds from an account, or perform any action requiring positive identification. To do this, the user holds the mobile communications device up to a smart cover reader. The smart cover reader communicates with the smart cover to identify the user. The smart cover can be decoupled from the user's mobile communications device and coupled to another mobile communications device if needed. Thus, the smart cover can be adapted to be coupled to any mobile communications device. The smart cover may provide housing for the front, the back, or any other surface or combination of surfaces of the mobile communications device. Furthermore, smart cover readers can be placed at checkouts, restaurants, banks, etc., for a convenient positive identification. Positive identification allows entry to secure areas or enables transfer of funds from an account. The secure element is powered through the antenna when a magnetic field is introduced in a form of contactless communication. This allows the smart cover to work independent of a battery or any other power source other than that provided by the smart cover reader.

A "mobile communications device", as used herein and throughout this disclosure, refers to any electronic device capable of communication with other electronic devices. Examples of a mobile communications device include a cellular telephone, a portable digital assistant (PDA), a laptop computer, a tablet computer, etc.

"Logic", as used herein and throughout this disclosure, refers to any information having the form of instruction signals and/or data that may be applied to affect the operation of a processor. Examples of processors are computer processors (processing units), microprocessors, digital signal processors, controllers and microcontrollers, etc. Logic may be formed from signals stored in a device memory. Software is one example of such logic. Examples of device memories that may comprise logic include RAM (random access memory), flash memories, ROMS (read-only memories), EPROMS (erasable programmable read-only memories), and EEPROMS (electrically erasable programmable read-only memories). Logic may also be comprised by digital and/or analog hardware circuits, for example, hardware circuits comprising logical AND, OR, XOR, NAND, NOR, and other logical operations. Logic may be formed from combinations of software and hardware.

For the following detailed description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIGS. 1A, 1B, and 1C show a smart cover 100 coupled to a mobile communications device 110, according to an exemplary embodiment of the present invention. FIG. 1A shows a front view of mobile communications device 110 for a smart cover. FIG. 1B shows a component view of smart cover 100. FIG. 1C shows a layered view of smart cover 100 where secure element 102, transceiver 104, and antenna 106 are held in between housing plate 109 and laminate 108. In this embodiment, smart cover 100 includes a housing plate 109, a secure element 102, a transceiver 104, and an antenna 106. Housing plate 109 is preferably composed of a rigid material and may include indentations for secure element 102, transceiver 104, and antenna 106 such that these features are received by the indentations. A laminate 108 may be applied over housing plate 109 to ensure the placement of secure element 102, transceiver 104, and antenna 106. Laminate 108 may also insulate and hide secure element 102, transceiver 104, and antenna 106. Housing plate 109 is a back cover of mobile communications device 110. Secure element 102 is used to authenticate a device or user. Secure element 102 includes a memory and a processor. The memory stores authentication information while the processor operates the memory and transceiver 104. Transceiver 104 enables smart cover 100 to wirelessly communicate through antenna 106 using near field communication. Secure element 102 is passive, which means it is powered through induction generated in antenna 106 when smart cover 100 is near a magnetic field. Antenna 106 is a loop near the perimeter of housing plate 109.

As seen in FIG. 1A, mobile communications device 110 further includes a display 114, an antenna 112, a keypad 116, and a microphone 118. Display 114 is an LCD or LED screen on which a user can view selections, numbers, letters, symbols, etc. Antenna 112 is a transducer designed to transmit or receive electromagnetic waves. Microphone 118 allows the user to verbally communicate with others using communications device 110. Keypad 116 allows the user to enter letters, numbers, and symbols in order to dial telephone numbers, create text messages or e-mails, etc. Smart cover 100, as seen in FIG. 1B, removably couples to communications device 110 using clips, snaps, etc. FIG. 1C shows a side view of smart cover 100. Secure element 102, transceiver 104, and antenna 106 are embedded within housing plate 109 with laminate 108 sealing the features into housing plate 109.

The present embodiment shows housing plate 109 as being a back cover of mobile communications device 110, however, the housing plate 109 may cover any surface or combination of surfaces of the mobile communications device 110. In exemplary embodiments the housing plate 109 is a back cover, a front cover, a faceplate, etc. The secure element 102 uses a form of contactless smart identification such as the technology for a contactless integrated circuit card in the International Organization for Standardization and International Electrotechnical Commission (ISO/IEC) 14443, which is incorporated by reference herein in its entirety. The secure element 102 includes logic on the memory for secure communication with a smart cover reader and providing identification in the form of a unique identifier. The secure element 102 and the transceiver 104 are shown enlarged for ease of disclosure. The secure element 102 and transceiver 104 can be made smaller than one square centimeter with a thickness of about one millimeter. This allows the secure element 102 and transceiver 104 to fit in many places on the smart cover 100. Other dimensions for the secure element 102 will be apparent to one having ordinary skill in the art.

FIGS. 2A and 2B respectively show a smart cover 200 coupled and decoupled from a mobile communications device 210, according to an exemplary embodiment of the present invention. FIG. 2A shows mobile communications device 210 coupled with smart cover 200. FIG. 2B shows smart cover 200 decoupled from mobile communications device 210. In this embodiment, smart cover 200 couples to the back of mobile communications device 210 and includes a back housing plate of mobile communications device 210. Mobile communications device 210 includes an antenna 212, a display 214, and a keypad 216. Smart cover 200 couples to mobile communications device 210 such that each feature of mobile communications device 210 is still easily accessible.

In some embodiments, decoupling the smart cover 200 with the mobile communications device 210 results in exposure of electronics within the mobile communications device 210. In these embodiments a replacement cover may be employed to protect the exposed electronics while the smart cover 200 is decoupled. In other embodiments decoupling the smart cover 200 does not expose electronics, such as when the housing plate is merely for aesthetic purposes.

Figures 3A, 3B:
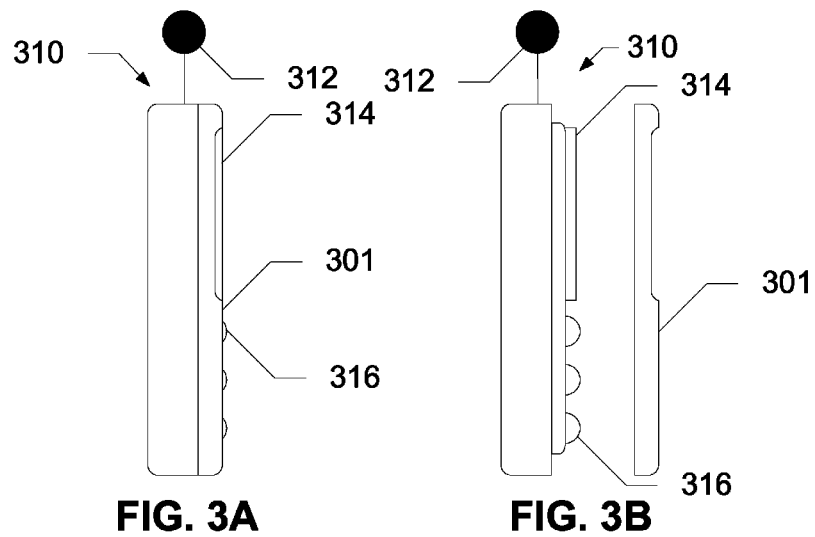
FIGS. 3A and 3B show a smart cover 301 coupled and decoupled from a mobile communications device 310, according to an exemplary embodiment of the present invention.

FIGS. 3A and 3B show a smart cover 301 coupled and decoupled from a mobile communications device 310, according to an exemplary embodiment of the present invention. FIG. 3A shows mobile communications device 310 coupled with smart cover 301. FIG. 3B shows mobile communications device 310 decoupled from smart cover 301. In this embodiment, smart cover 301 couples to the front of mobile communications device 310 and includes a housing faceplate of mobile communications device 310. Mobile communications device 310 includes an antenna 312, a display 314, and a keypad 316. Smart cover 301 couples to communications device 310 such that each of these features of communications device 310 is still easily accessed. Smart cover 301 includes cutouts around the keys of keypad 316 such that the keys 316 protrude through smart cover 301 and may be pressed. Smart cover 301 includes another cutout around display 314 such that display 314 remains visible and accessible for touchscreen embodiments.

In embodiments where the mobile communications device 310 does not have a touchscreen, the smart cover 301 may have a window in front of display 314 to protect display 314. Other mobile communications may have a hidden keypad that slides or folds out. In these embodiments the smart cover 301 may not need cutouts for the keys of the keypad.

Figure 4:
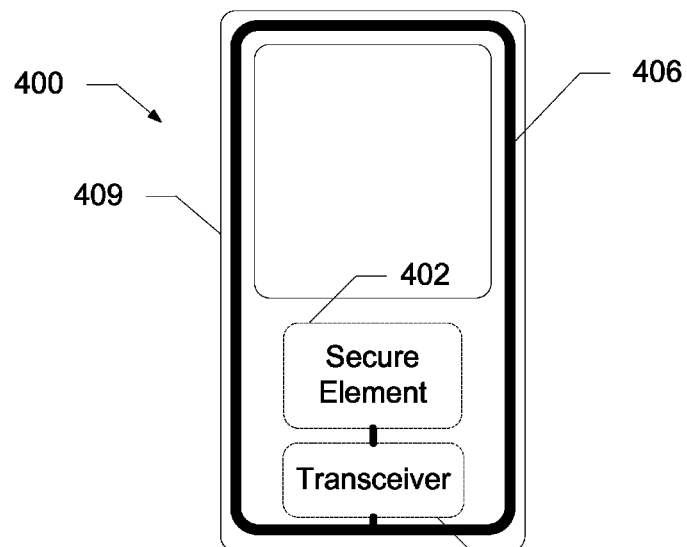
FIG. 4 shows a smart cover 401 which includes a front housing plate of a mobile communications device, according to an exemplary embodiment of the present invention.

FIG. 4 shows a smart cover 400 which includes a front housing plate 409 of a mobile communications device, according to an exemplary embodiment of the present invention. In this embodiment, secure element 402, transceiver 404, and antenna 406 are each integrated into housing plate 409. Antenna 406 loops around the perimeter of the front housing plate 409. Antenna 406 loops such that it does not interfere with the keypad or display of the mobile communications device. The loop of antenna 406 may loop around just the display, just the keypad, or both. Secure element 402 and transceiver 404 are located on housing plate 409 such that they do not interfere with the features of the mobile communications device. Secure element 402 and transceiver 404 may be located on a part of housing plate 409 fitting between keys of the keypad, around the edge of smart cover 401, between the display and keypad, etc. The placement of antenna 406, secure element 402, and transceiver 404 may depend on the type of mobile communications device, as different mobile communications devices have different feature locations.

Some mobile communications devices may have a hidden keypad that slides or folds out. In these embodiments the smart cover 400 may not need cutouts for the keys of the keypad. The secure element 402 and transceiver 404 can be made smaller than one square centimeter with a thickness of about one millimeter. This allows the secure element 402 and transceiver 404 to fit in many places on the smart cover 400.

Figure 5:
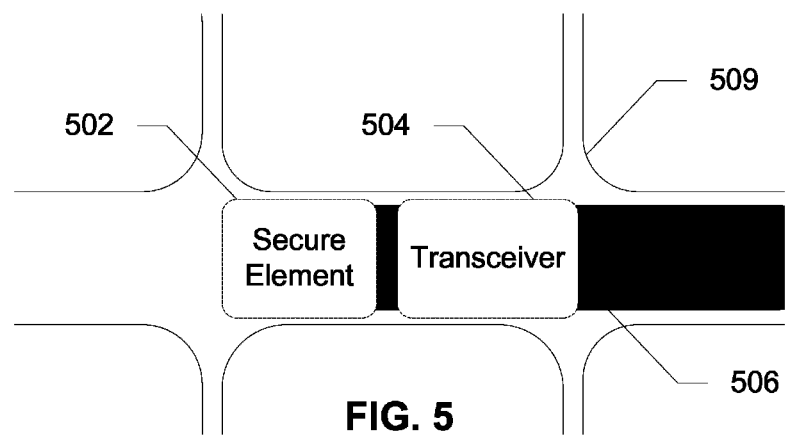
FIG. 5 shows a placement of a secure element 502, transceiver 504, and antenna 506 included in a smart cover 501, according to an exemplary embodiment of the present invention.

FIG. 5 shows a placement of a secure element 502, transceiver 504, and antenna 506 included in a smart cover, according to an exemplary embodiment of the present invention. In this embodiment, the smart cover includes a housing faceplate 509 of a communications device. Because secure element 502, transceiver 504, and antenna 506 may be very small, each may be coupled to the housing faceplate 509 between the cutouts for keys of a keypad. Similarly, secure element 502, transceiver 504, and antenna 506 may be placed anywhere on the front or back housing plates of the mobile communications device.

Figure 6:
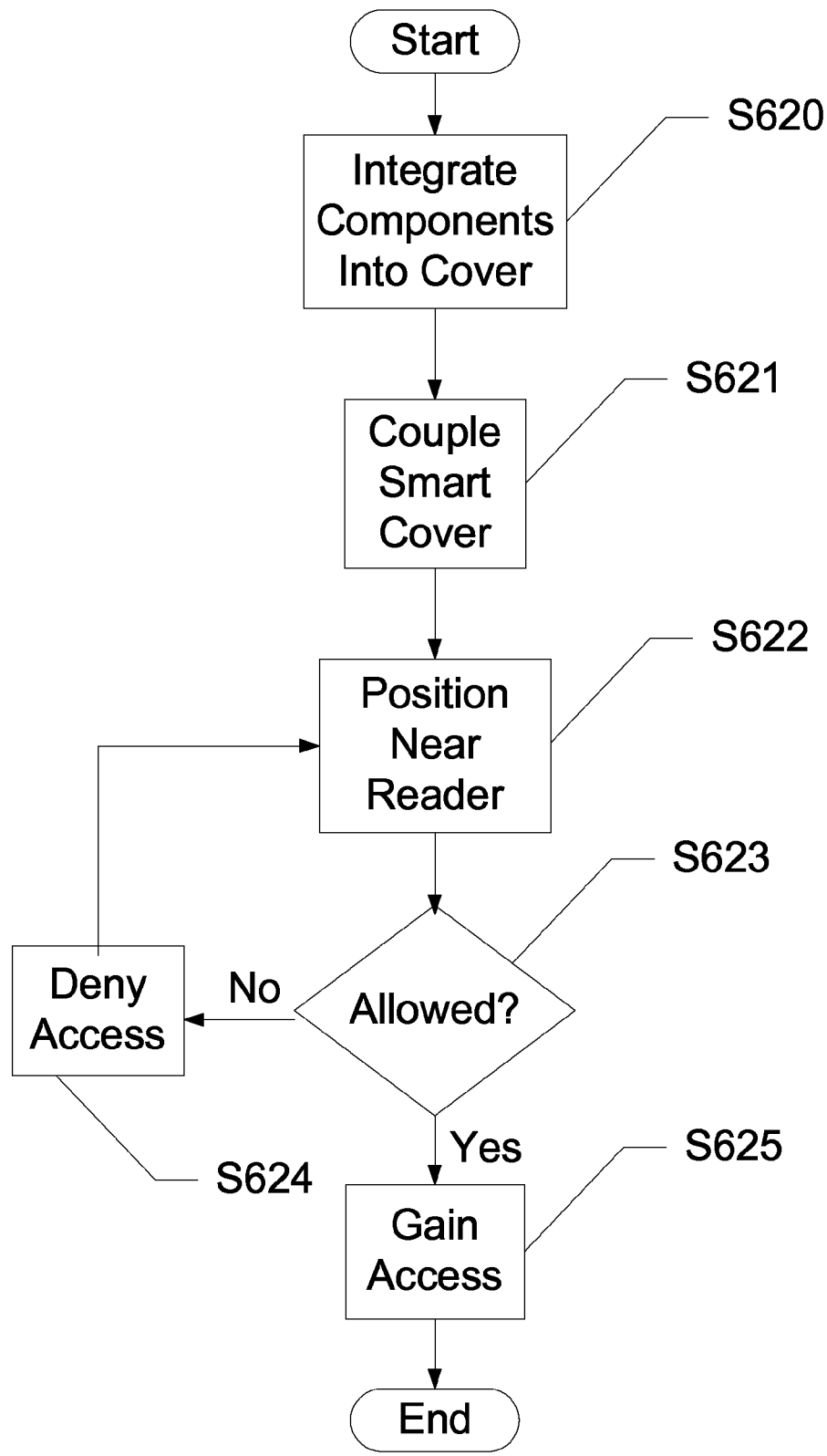
FIG. 6 shows a method of using a smart cover on a communications device, according to an exemplary embodiment of the present invention.

FIG. 6 shows a method of using a smart cover on a communications device, according to an exemplary embodiment of the present invention. In this embodiment, a secure element having a unique identifier is integrated along with the transceiver and antenna into a housing plate or cover of the mobile communications device S620. The integration may be accomplished by etching one or more cavities in the housing plate such that the cavity is shaped to receive the secure element, transceiver, and antenna. A laminate may be applied or pasted over the components and housing plate to protect and secure the secure element, transceiver, and antenna. With the components within the housing plate to form a smart cover, the smart cover is coupled to the mobile communications device S621. The smart cover may be removably coupled by use of clips, hooks, etc. The mobile communications device with the smart cover is then positioned near a smart cover reader S622, for instance, by a user. The smart cover reader may be a reader for a point-of-sale device, a security server, or may be integrated into a security system at a point where access to a secure area is required. It is then determined, by the smart cover reader, whether or not the unique identifier of the secure element is allowed S623. This may be accomplished by referring to an "allowed list" or other database on a security system, either stored locally or on a remote server on a network. If the unique identifier is not allowed or not recognized, then the user is denied access S624. The user may then attempt to position the smart cover near the smart cover reader again S622. If the unique identifier is allowed, then access is granted.

In exemplary embodiments the user may be an employee and the unique identifier allows the user to gain access to a secure area. Alternatively, the user may be making a purchase and the unique identifier is the user's identification or account number. This may be access to a secure system, access to a building, access to proceed with a payment, etc. In some embodiments, the step of denying access S624 may be repeated a specified number of times before an alarm is sounded, or the secure area or resource is permanently blocked.

As described above, the smart cover reader may be part of a security system that is configured to limit access to a secure resource or a secure area. A secure resource may be an encrypted file on a network, or a bank account associated with a unique identifier. The secure area may be a physical location that is blocked by a barrier. In either case, the smart cover reader can unlock access to the secure area/resource if the identifier matches an authorized identifier.

Figure 7:
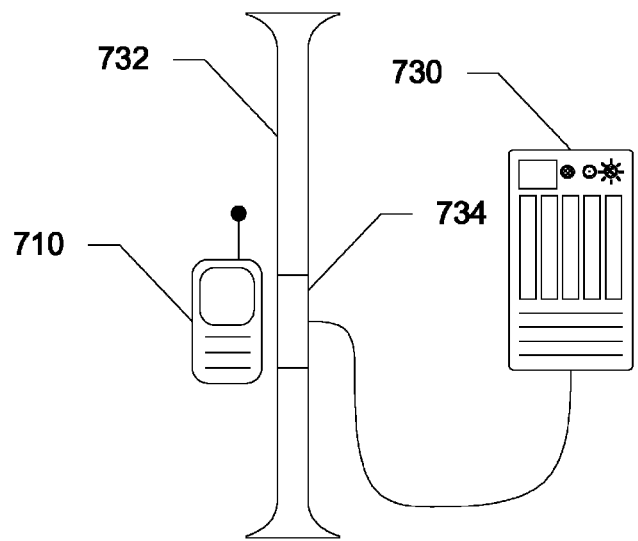
FIG. 7 shows a system for secure identification, according to an exemplary embodiment of the present invention.

FIG. 7 shows a system for secure identification, according to an exemplary embodiment of the present invention. In this embodiment, the system includes a smart cover coupled to a mobile communications device 710, a smart cover reader 734 in communication with the smart cover, a security server 730 in communication with smart cover reader 734, and a barrier 732 in communication with security server 730. A user places mobile communications device 710 near smart cover reader 734. Smart cover reader 734 is a contactless reader and communicates with the secure element of the smart cover coupled to mobile communications device 710 through the transceiver by powering the antenna with a magnetic field. Smart cover reader 734 sends a unique identifier from the secure element of the smart cover to security server 730. Security server 730 includes logic for verifying the unique identifier. The verification may retrieve a list of acceptable identities from a database stored locally on the server 730 or on a remote server on a network in communication with security server 730. Security server 730 verifies the unique identifier and either grants or denies access. Alternatively, smart cover reader 734 may verify the unique identifier and send the verification, or lack thereof, to security server 730. If access is granted, then security server 730 may unlock or remove barrier 732 allowing the user access to a secure area. If access is not granted, then barrier 732 remains in place and the user may be able to attempt access again.

Figure 8:
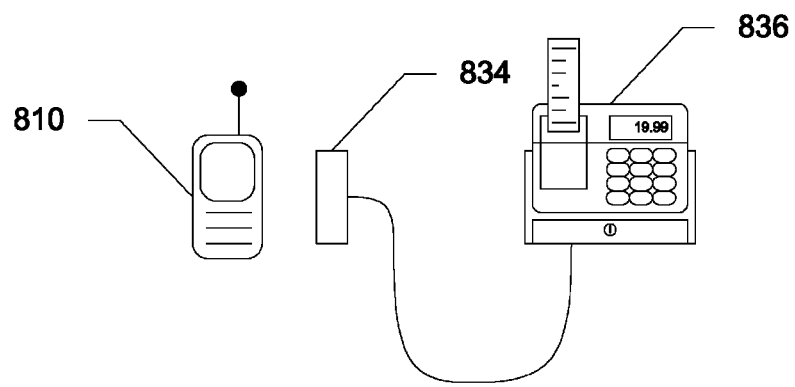
FIG. 8 shows a system for secure identification, according to an exemplary embodiment of the present invention.

FIG. 8 shows a system for secure identification, according to an exemplary embodiment of the present invention. In this embodiment, the system includes a smart cover coupled to a mobile communications device 810, a smart cover reader 834 in communication with the smart cover, and a point-of-sale device 836 in communication with smart cover reader 834. A user wishing to make a purchase places mobile communications device 810 near smart cover reader 834. Smart cover reader 834 is a contactless reader and communicates with the secure element of the smart cover coupled to mobile communications device 810 through the transceiver by powering the antenna with a magnetic field. Smart cover reader 834 sends a unique identifier from the secure element of the smart cover to point-of-sale device 836. Point-of-sale device 836 includes logic for associating an account with the unique identifier and may also include or be in communication with a database of associated accounts, for instance, a billing server on a network. Point-of-sale device 836 is in communication with an account of the user. Point-of-sale device 836 verifies that the unique identifier correlates with a valid account of the user. Alternatively, smart cover reader 834 may verify the unique identifier and send the verification, or lack thereof, to point-of-sale device 836. If the identifier is verified, then the transaction proceeds. If the identifier is not verified, then the user may be able to reposition communications device 810 near smart cover reader 834 or may choose a different form of payment.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A cover for a mobile device, the cover comprising:
a housing plate;
a laminate disposed over the housing plate, the laminate sealing a secure element, a transceiver, and an antenna on the housing plate;
a plurality of cutouts corresponding to a plurality of elements of the mobile device, the plurality of cutouts extending through the housing plate and the laminate;
the secure element disposed in between the plurality of cutouts and between the housing plate and the laminate, the secure element comprising a processor and a memory storing authentication information;
the transceiver coupled to the secure element and disposed in between the plurality of cutouts and between the housing plate and the laminate; and
the antenna coupled to the transceiver and disposed between the housing plate and the laminate, the antenna looped around a perimeter of the plurality of cutouts, wherein the secure element communicates the authentication information through the transceiver subsequent to being powered, and wherein the secure element is powered through induction generated in the antenna looped around the perimeter of the plurality of cutouts when the cover is introduced to a magnetic field such that the secure element is powered independently of a power source of the mobile device.

2. The cover of claim 1, wherein the plurality of elements of the mobile device comprises at least one key and at least one display.

3. The cover of claim 1, wherein the laminate insulates the secure element, the transceiver, and the antenna.

4. The cover of claim 1, wherein the laminate conceals the secure element, the transceiver, and the antenna.

5. The cover of claim 1, wherein the housing plate comprises a plurality of indentations that receives the secure element, the transceiver, and the antenna.

6. The cover of claim 1, wherein the cover is a front faceplate for the mobile device.

7. A cover for a mobile device, the cover comprising:
a housing plate;
a laminate disposed over the housing plate, the laminate sealing a secure element, a transceiver, and an antenna on the housing plate;
a plurality of cutouts corresponding to a plurality of elements of the mobile device, the plurality of cutouts extending through the housing plate and the laminate;
the secure element disposed in between the plurality of cutouts and between the housing plate and the laminate, the secure element comprising a processor and a memory storing authentication information;
the transceiver coupled to the secure element and disposed in between the plurality of cutouts and between the housing plate and the laminate;
the antenna coupled to the transceiver and disposed between the housing plate and the laminate, the antenna looped around a perimeter of the plurality of cutouts, wherein the secure element communicates the authentication information through the transceiver subsequent to being powered, and wherein the secure element is powered through induction generated in the antenna looped around the perimeter of the plurality of cutouts when the cover is introduced to a magnetic field such that the secure element is powered independently of a power source of the mobile device; and a clip for removably coupling the cover to the mobile device, wherein the cover couples to the mobile device only via the clip.

8. The cover of claim 7, wherein the authentication information stored in the memory of the secure element is verified, via the antenna, by a reader.

9. The cover of claim 8, wherein the reader is coupled to a point-of-sale device and wherein the point-of-sale device is in communication with an account associated with the mobile device.

10. The cover of claim 8, wherein the reader is coupled to a security server.

11. The cover of claim 10, wherein the security server deactivates a security feature in communication with the security server.

12. The cover of claim 7, wherein the housing plate comprises a plurality of indentations that receives the secure element, the transceiver, and the antenna.

13. The cover of claim 7, wherein the plurality of elements of the mobile device comprises at least one key and at least one display.

14. A mobile device, comprising:
a plurality of elements; and
a cover comprising
a housing plate,
a laminate disposed over the housing plate, the laminate sealing a secure element, a transceiver, and an antenna on the housing plate,
a plurality of cutouts corresponding to the plurality of elements, the plurality of cutouts extending through the housing plate and the laminate,
the secure element disposed in between the plurality of cutouts and disposed between the housing plate and the laminate, the secure element comprising a processor and a memory storing authentication information,
the transceiver coupled to the secure element and disposed in between the plurality of cutouts and between the housing plate and the laminate, and
the antenna coupled to the transceiver and disposed between the housing plate and the laminate, the antenna looped around a perimeter of the plurality of cutouts, wherein the secure element communicates the authentication information through the transceiver subsequent to being powered, and wherein the secure element is powered through induction generated in the antenna looped around the perimeter of the plurality of cutouts when the cover is introduced to a magnetic field such that the secure element is powered independently of a power source of the mobile device.

15. The mobile device of claim 14, wherein a reader verifies, via the antenna, the authentication information stored in the memory.

16. The mobile device of claim 15, wherein the reader is coupled to a point-of-sale device.

17. The mobile device of claim 14, wherein the housing plate comprises a plurality of indentations that receives the secure element, the transceiver, and the antenna.

18. The mobile device of claim 14, wherein the plurality of elements comprises at least one key and at least one display.

19. The mobile device of claim 14, wherein the laminate conceals the secure element, the transceiver, and the antenna.

20. The mobile device of claim 14, wherein the cover is a front faceplate for the mobile device.

\* \* \* \* \*